United States Patent Office 3,546,251
Patented Dec. 8, 1970

3,546,251
PROCESS FOR PRODUCING CAPROLACTONE
Satoshi Matsumoto and Etsuo Tanaka, Yokohama-shi, Japan, assignors to Chisso Corporation, Osaka, Japan, a corporation of Japan
No Drawing. Filed May 24, 1967, Ser. No. 640,821
Claims priority, application Japan, May 25, 1966, 41/33,326
Int. Cl. C07d 9/00; C08g 12/02
U.S. Cl. 260—343    9 Claims

ABSTRACT OF THE DISCLOSURE

A method for producing ε-caprolactone from the corresponding polymers of ε-caprolactone by depolymerizing them with heat in the presence of a suitable catalyst and at a temperature of 210°–320° C. The starting materials, polymers of epsilon-caprolactone may contain ε-caprolactone and/or ε-hydroxy-caproic acid.

---

This invention relates to a method for manufacturing ε-caprolactone by heating the corresponding polymers of ε-caprolactone, containing or not containing ε-caprolactone itself and/or ε-hydroxy-caproic acid, at 210°–320° C. in the presence of a catalyst.

It has been known heretofore that ε-caprolactone is obtained by oxidizing cyclohexanone. Namely, various methods therefor have been known, one of them being a method of oxidizing cyclohexanone in the absence of water using a peracid such as peracetic acid, perbenzoic acid or the like, and another being a method of oxidizing cyclohexanone in an acidic or alkaline state using hydrogen peroxide.

Although ε-caprolactone can be obtained in a better yield by the former method, a considerable amount of high boiling residual substances mainly composed of oligomers and/or polyesters of ε-caprolactone, is yielded, in case ε-caprolactone is recovered by the distillation of the product. Therefore, an effective recovery of ε-caprolactone from such high boiling substances has been desired.

On the other hand, in the latter method, only an extremely small amount of ε-caprolactone is produced because a large amount of ε-hydroxy caproic acid and oligomers and/or polyesters of ε-caprolactone are formed.

Moreover, in this case, a considerable amount of cyclohexanone hydroperoxide or similar peroxide exists in the oxidation products, and so the peroxides must be converted to ε-caprolactone and derivatives thereof, for example, by warming these peroxides in an acidic state.

Accordingly, the above-mentioned oxidation products must be usually treated, for example, by extracting them wtih a suitable solvent, subsequently allowing to stand, warming or heating them under an acidic condition containing an organic or inorganic acid and washing with water.

After these treatments, ε-caprolactone is catalytically ring-opened by means of nascent hydrogen originated from water, acid, alcohol or the like present in the system, especially by the heating during the time of vacuum distillation, to form ε-hydroxy caproic acid or to be converted into oligomers and/or polyesters of ε-caprolactone by condensation or polymerization. Accordingly, it is impossible to obtain pure ε-caprolactone in a better yield by means of distillation and purification of the system after a treatment such as the above-mentioned.

For the above-mentioned reasons, various studies have been carried out by the present inventors in order to recover with a good efficiency, ε-caprolactone from oligomers and/or polyesters containing or not containing ε-caprolactone and/or ε-hydroxy-caproic acid, and the method of the present invention has been completed.

Exemplary systems comprising oligomers and/or polyesters of ε-caprolactone containing or not containing ε-caprolactone and/or ε-hydroxy-caproic acid in the present invention include the systems obtained after the removal of peroxides from the products in the above-mentioned two methods for oxidizing cyclohexanone, the system obtained after further treatment of said products, and the system obtained by treating cyclohexanone hydroperoxide derived from the oxidation of cyclohexanone with hydrogen peroxide as cyclohexanol hydroperoxide derived from the oxidation of cyclohexanol with active oxygen, or the condensate between any one of the above mentioned hydroperoxides and cyclohexanone, with an acid such as concentrated sulfuric acid, acetic acid, hydrofluoric acid or the like (rearrangement reaction occurs). These systems are shown in the following formulas. Any systems other than the above-mentioned are also included if they belong to the system containing oligomers and/or polyesters of ε-caprolactone.

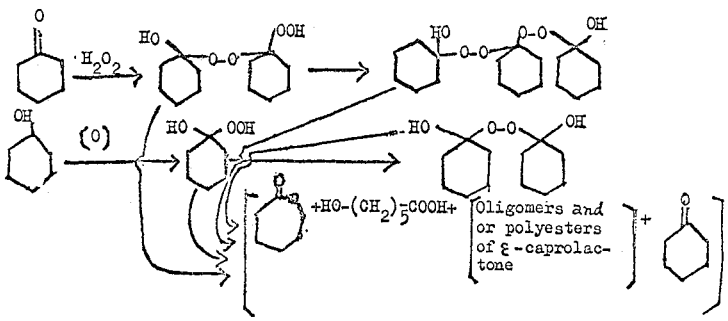

It has been heretofore known that a monomer can be obtained by depolymerizing, on heating, a specified polyester in the presence of a catalyst. (W. H. Carothers et al., J.A.C.S. 57, 929–934, 1935.) However, it was also shown in the report that the above-mentioned fact can not always likewise be applied to various kinds of polyesters.

In fact, there was described that when polyesters of ε-caprolactone was treated at 250° C. and 1–2 mm. Hg, only a small amount of distillate (ε-caprolactone) was obtained (W. H. Carothers et al., J.A.C.S. 56, 455, 1934).

It has been found by the present inventors that oligomers and/or polyesters of ε-caprolactone can be depolymerized by heat at a temperature within specified range in the presence of a suitable catalyst to form ε-caprolactone with an excellent yield. This recovery has been completed based upon the following experimental results:

(i) A mixture of 200 g. of ε-caprolactone, 200 g. of benzene and 300 cc. of 1 N sulfuric acid was refluxed on heating with stirring for 4 hours. Then, an organic layer was collected and washed with each 20 cc. of water six times, and thereafter benzene and water were removed therefrom under a reduced pressure to obtain 205 g. of a solid polyester (M.P. 30–50° C.). To 100 g. of the polyester thus obtained was added 1 g. of sodium hydroxide (1% to the polyester), and the mixture was heated with stirring. The greater part of the residual water (about 5 g.) was distilled off before the temperature reached 200° C. Additional heating to 260°–320° C. yielded 86.5 g. of a fraction of (114°–126° C./20 mm. Hg) (Yield: 91%). 84 g. of $\epsilon$-caprolactone (77°–80° C./2 mm. Hg) was obtained by redistillation.

(ii) The (i) experiment was repeated, except that sorbitol or ethylene glycol was employed as an initiator in the polymerization of $\epsilon$-caprolactone, and the amount of sodium hydroxide used in the depolymerization on heating of the resultant polymer was altered.

The results are shown in the following table:

|  | Initiator used | | | |
| --- | --- | --- | --- | --- |
|  | Sorbitol | Sorbitol | Sorbitol | Ethylene glycol |
| Polyester: | | | | |
| Molecular weight | 3,200 | 3,300 | 3,200 | 1,200 |
| Acid value | 6.83 | 3.40 | 6.83 | 0.1 |
| Heat decomposition: | | | | |
| Amount of sodium hydroxide used, g. | 0 | 2 | 5 | 5 |
| Amount of $\epsilon$-caprolactone obtained, g. | 23.5 | 66.6 | 72.8 | 81.3 |
| Yield of $\epsilon$-caprolactone, percent | 25 | 72.9 | 79.1 | 82.5 |

From the table, it can be seen that oligomers and/or polyesters of $\epsilon$-caprolactone can be decomposed to some extent to form $\epsilon$-caprolactone, even in the absence of a catalyst, e.g., sodium hydroxide but the heating at a temperature within the range of the present invention in the presence of sodium hydroxide, markedly increases the yield of $\epsilon$-caprolactone.

An object of the present invention is to provide a method for recovering $\epsilon$-caprolactone with a good efficiency from the systems comprising the corresponding polymers of $\epsilon$-caprolactone by the depolymerization with heat.

Briefly speaking, the present invention consists in the method which comprises heating the corresponding polyesters of $\epsilon$-caprolactone, containing or not containing $\epsilon$-caprolactone and/or $\epsilon$-hydroxy-caproic acid, at 210°–320° C. in the presence of a suitable catalyst.

Amounts of the catalysts to be used are in the range of 0.5–5 parts, preferably 1–3 parts based on the weight of 100 parts of oligomers and/or polyesters of $\epsilon$-caprolactone. The decomposition is insufficient if the amount is smaller than 0.5 part, while the use of an amount larger than 5 parts is also not preferable because of the increased amount remaining as salt. The pressure to be employed may be atmospheric and subatmospheric pressure.

The heating temperature is in the range of 210°–320° C., and if a lower boiling substance such as water or others is contained in the reaction system, the treatment for removal of water or other lower boiling substances may be carried out beforehand at a temperature lower than the above-mentioned range, followed by decomposing with heat at a temperature within the range of the present invention. When the method of the present invention is carried out under preferable conditions, $\epsilon$-caprolactone having a high purity can be obtained with a yield of as high as 80–95% by one treatment. If the conversion is insufficient by one treatment, similar treatments may be repeated in order to increase the conversion.

EXAMPLE 1

Into 330 g. of 20% aqueous sodium hydroxide solution were simultaneously dropped 150 g. of cyclohexanone and 330 g. of 30% aqueous hydrogen peroxide at 50° C. for 5 hours to carry out oxidation. Then, after unreacted cyclohexanone was removed from the reaction liquid by ether-extraction, the resultant residual liquid was treated with sodium hyposulfite, followed by warming in an acidic state, and adding potassium iodide, to decompose the formed peroxide perfectly. After the decomposition, the liquid was extracted with ether. The extract was dried over anhydrous sodium sulfate, followed by concentration. 132 g. of yellowish, viscous, oily substance was obtained.

100 g. of the oily substance was heated with stirring in 200 cc. of benzene in the presence of 1.5 g. of para-toluene sulfonic acid to azeotropically remove water. After washing of the residual oil with water and subsequent removal of the solvent under a reduced pressure, there was obtained 95 g. of solid comprising oligomers and polyesters of $\epsilon$-caprolactone. To 95 g. of the solid was added 1 g. of sodium hydroxide, and the mixture was heated with stirring. The greater part of the residual water had been distilled off before the bath temperature reached 260° C. Further by elevating the bath temperature up to 260°–320° C., 85 g. of a fraction of 114°–126° C./20 mm. Hg (yield: 89%) was obtained. 82 g. of $\epsilon$-caprolactone was obtained as a fraction of 77°–80° C./2 mm. Hg by redistillation.

EXAMPLE 2

One g. of sodium hydroxide was added to 100 g. of the oily substance of Example 1 from which water had not yet been removed by azeotropic distillation, and then the mixture was heated with stirring to distill off residual water. Then, the distillation under 20 mm. Hg at a bath temperature of 260°–320° C. yielded 85 g. of a fraction. 83 g. of $\epsilon$-caprolactone (82°–84° C./4 mm. Hg) was obtained (yield: 91%).

EXAMPLE 3

A high boiling residue was obtained when cyclohexanone was oxidized at about 40° C., with 15% solution of peracetic acid in ethyl acetate, using ethyl acetate as a solvent, followed by distilling. The resultant product was examined. To the high boiling substance mainly composed of polyesters of $\epsilon$-caprolactone, was added 1 g. of sodium hydroxide, and the mixture was heated to 300° C. as expressed by the bath temperature. $\epsilon$-caprolactone could be obtained with a yield of 92%.

EXAMPLE 4

A solution of peracetic acid in acetic acid was prepared at 40° C. in the presence of 4 g. of sulfuric acid from a mixture of 360 g. of acetic acid and 100 g. of 30% hydrogen peroxide. After adding 5.6 g. of sodium phosphate, 80 g. of cyclohexanone was dropped into the resultant solution at 40° C. for 3 hours. The system after completion of the reaction was extracted with 200 cc. of ether, successively washed with water, water containing acid sodium sulfite and water, dried and evaporated to remove ether. 65 g. of a high boiling residue was obtained. To 40 g. of the high boiling substance was added 0.35 g. of 1% sodium hydroxide. About 5 g. of dilute acetic acid was recovered by distillation. Heating to a bath temperature of 280° C. gave $\epsilon$-caprolactone with a yield of 93–94%.

Nextly, Example 2 was repeated, except that kinds of catalysts and amounts to be used were varied as follows:

| Catalyst | | Used amount of catalyst, percent | Yield, percent |
|---|---|---|---|
| Example 5 | NaOH | 2 | 92.7 |
| Example 6 | NaOH | 0.5 | 55.7 |
| Example 7 | NaOH | 5 | 69.6 |
| Example 8 | KOH | 2 | 91 |
| Example 9 | Ca(OH)$_2$ | 2 | 82 |
| Example 10 | Cobalt acetate | 2 | 56.7 |
| Example 11 | Zinc acetate | 2 | 86.1 |
| Example 12 | Manganese acetate | 2 | 79.0 |
| Example 13 | Magnesium chloride | 2 | 40.0 |
| Control | Non-catalyst | | [1] 21.5+35 |

[1] In the case of non-catalyst, ring lactone (dimer) of caprolactone is obtained with a yield of about 35%.

In addition, the unconverted substances in the above-mentioned examples could be converted into ε-caprolactone by further repeating the same procedures.

What is claimed is:

1. A method for producing epsilon-caprolactone from the corresponding polymers of epsilon-caprolactone which comprises distilling by heating said polymers at a temperature from 210 to 320° C. in the presence of a catalyst selected from the group consisting of zinc acetate, cobalt acetate, and manganese acetate and recovering epsilon-caprolactone.

2. A method for producing epsilon-caprolactone from the corresponding polymers of epsilon-caprolactone which comprises distilling by heating said polymers at a temperature from 260 to 320° C. under a reduced pressure of about 20 mm. Hg in the presence of about 2 parts, based on the weight of 100 parts of the polymers of caprolactone, of a catalyst of zinc acetate and recovering epsilon-caprolactone.

3. A method according to claim 1 wherein said polymers further contain epsilon-caprolactone.

4. A method according to claim 1 wherein said polymers further contain epsilon-caprolactone and epsilon-hydroxy-caproic acid.

5. A method according to claim 1 wherein said distilling by heating is carried out under a reduced pressure of about 20 mm. Hg.

6. A method according to claim 1 wherein 0.5-5 parts of catalyst based on 100 parts by weight of the polymer are present.

7. A method according to claim 1 wherein said catalyst is cobalt acetate.

8. A method for producing epsilon-caprolactone from the corresponding polymers of epsilon-caprolactone which comprises distilling by heating said polymers at a temperature from 210 to 320° C. in the presence of manganese acetate and recovering epsilon-caprolactone.

9. A method according to claim 8 wherein 0.5-5 parts of manganese acetate based on 100 parts by weight of the polymer are present.

References Cited

UNITED STATES PATENTS 2,020,298   11/1935   Carothers et al. _____ 260—98

FOREIGN PATENTS 1,411,213   8/1965   France _____ 260—343
1,474,903   2/1967   France _____ 260—343

OTHER REFERENCES

Hill et al.: JACS, 55:5031–9 (December 1933).
Van Natta et al.: JACS 56:455–7 (February 1934).

HENRY R. JILES, Primary Examiner
C. M. SHURKO, Assistant Examiner

U.S. Cl. X.R.
260—78.3